United States Patent
Rao (10) Patent No.: US 8,086,501 B2
(45) Date of Patent: Dec. 27, 2011

(54) METHOD AND SYSTEM FOR CREATIVE COLLABORATIVE MARKETPLACES

(75) Inventor: Venkatesh Guru Rao, Arlington, VA (US)

(73) Assignee: Xerox Corporation, Norwalk, CT (US)

( * ) Notice: Subject to any disclaimer, the term of this patent is extended or adjusted under 35 U.S.C. 154(b) by 611 days.

(21) Appl. No.: 12/331,677

(22) Filed: Dec. 10, 2008

(65) Prior Publication Data
US 2010/0145842 A1    Jun. 10, 2010

(51) Int. Cl.
*G06Q 30/00* (2006.01)

(52) U.S. Cl. .............. 705/26.4; 705/26.1; 705/26.8; 705/27.1

(58) Field of Classification Search ............ 705/26, 705/27, 14, 1
See application file for complete search history.

(56) References Cited

U.S. PATENT DOCUMENTS

| | | | |
|---|---|---|---|
| 5,826,244 | A | 10/1998 | Huberman |
| 6,272,473 | B1 | 8/2001 | Sandholm |
| 6,292,830 | B1 | 9/2001 | Taylor et al. |
| 6,952,678 | B2 | 10/2005 | Williams et al. |
| 7,200,570 | B1 | 4/2007 | Wu |
| 7,231,365 | B2 | 6/2007 | Kashima et al. |
| 7,272,579 | B1 * | 9/2007 | Canali et al. .............. 705/37 |
| 7,587,341 | B2 * | 9/2009 | Wagner et al. ............ 705/26.4 |
| 2003/0097296 | A1 * | 5/2003 | Putt .............................. 705/11 |
| 2003/0225677 | A1 | 12/2003 | Sandholm et al. |
| 2004/0210490 | A1 * | 10/2004 | Almstead et al. ............ 705/26 |
| 2004/0210510 | A1 * | 10/2004 | Cullen et al. ................. 705/37 |
| 2005/0108036 | A1 | 5/2005 | Andreoli et al. |
| 2006/0041503 | A1 | 2/2006 | Blair et al. |
| 2007/0073723 | A1 | 3/2007 | Ramer et al. |
| 2007/0192201 | A1 | 8/2007 | Nalik |
| 2008/0114661 | A1 | 5/2008 | Byde et al. |

OTHER PUBLICATIONS

"Tejari Introduces Next Generation of E-Commerce with major upgrade to its trading technology" (Al Bawaba. London: Nov. 19, 2006. p. 1).*

* cited by examiner

*Primary Examiner* — Jeffrey A Smith
*Assistant Examiner* — Courtney Stopp
(74) *Attorney, Agent, or Firm* — Pepper Hamilton LLP (57) ABSTRACT

In an embodiment, a method of conducting a multi-level transaction includes receiving a primary call for proposals, receiving one or more primary bids by a computing system with respect to the primary call for proposals, receiving one or more secondary calls for proposals for each primary bid, receiving one or more secondary bids by a computing system with respect to the one or more secondary calls for proposals, automatically determining an estimate of a trustworthiness rating for each primary bid, receiving the selection of a primary bid based on the estimates of the trustworthiness rating, and displaying the selection of the primary bid. Each secondary call for proposals includes a job request associated with the primary bid. The estimate of the trustworthiness rating is based on a trustworthiness rating associated with the primary bid and one or more secondary bid trustworthiness ratings.

28 Claims, 5 Drawing Sheets

METHOD AND SYSTEM FOR CREATIVE COLLABORATIVE MARKETPLACES

BACKGROUND

1. Technical Field

This application relates to conducting multi-level transactions in a computing environment. More specifically, the present disclosure relates to systems and methods of conducting a multi-level transaction and determining estimated costs of fulfillment for associated primary bids.

2. Description of Related Prior Art

In the world of auctions and transactions, buyers initiate the process with a call for proposals. These calls for proposals have traditionally led providers/contractors to submit bids in hopes of contracting for the work. Buyers will then select an optimal bid from those submitted. Prior to the use of online marketplaces, this process could be extremely tedious and time-consuming. Further, buyers could select a provider's bid where the provider still had to submit bids to sub-contractors to fully complete the provider's own work, a factor which could affect the overall estimate.

Buyers additionally were unable to identify which sub-contractors were selected, or to know how trustworthy these sub-contractors were reputed to be. Even as use of online marketplaces became more common, structured mechanisms still did not exist to assist buyers with these issues. In effect, the process was still slow and inefficient due to the unstructured nature of subcontracting communication in complex multi-party transactions.

SUMMARY

Before the present systems, devices and methods are described, it is to be understood that this disclosure is not limited to the particular systems, devices and methods described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "rating" is a reference to one or more ratings and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention. As used herein, the term "comprising" means "including, but not limited to."

In an embodiment, a method of conducting a multi-level transaction includes receiving a primary call for proposals, receiving one or more primary bids by a computing system with respect to the primary call for proposals, receiving one or more secondary calls for proposals for each primary bid, receiving one or more secondary bids by a computing system with respect to the one or more secondary calls for proposals, automatically determining an estimate of a trustworthiness rating for each primary bid, receiving the selection of a primary bid based on the estimates of the trustworthiness rating, and displaying the selection of the primary bid. Each secondary call for proposals includes a job request associated with the primary bid. The estimate of the trustworthiness rating is based on a trustworthiness rating associated with the primary bid and one or more secondary bid trustworthiness ratings.

In an embodiment, a system for conducting a multi-level transaction includes a processor in communication with an output device, and a computer-readable storage medium in communication with the processor. The computer-readable storage medium includes one or more programming instructions for receiving a primary call for proposals, receiving one or more primary bids with respect to the primary call for proposals, receiving one or more secondary calls for proposals for each primary bid, receiving one or more secondary bids with respect to the one or more secondary calls for proposals, determining an estimate of a trustworthiness rating for each primary bid, and causing the selection of one of the one or more primary bids based on the estimates of the trustworthiness rating.

BRIEF DESCRIPTION OF THE DRAWINGS

Aspects, features, benefits and advantages of the present application will be apparent with regard to the following description and accompanying drawings, of which.

DETAILED DESCRIPTION

The following terms shall have, for the purposes of this application, the meanings set forth below.

For the purposes of the discussion below, a "multi-level transaction" refers to a recursive auction structure or other atomic transaction mechanism in which teams of service and/or product providers collaborate to connect and submit bids to a buyer within an online marketplace.

An "online marketplace" refers to a base marketplace system, base social network system and/or a collaborative marketplace system. The base marketplace system may include registered sets of users as buyers or sellers, an economic community database system maintaining profiles, data and transaction histories, posting mechanisms, guarantee and commission mechanisms, monitoring systems and qualification mechanisms in order to restrict bidding to specifically qualified providers. These base marketplace systems are commonly understood in the prior art. Examples of the base social network system would include sites such as LinkedIn, Facebook, elance.com, odesk.com and digg.com.

The "collaborative marketplace system" is a combination of a base marketplace system, a base social network system and additional features. For example, the collaborative marketplace system would integrate a base marketplace system and a base social network system and add additional features. The additional features may include a market database system for the base marketplace component augmented to allow individual calls for proposals to be associated in a tree-like structure. An additional database system may contain task breakdown structures associated with each call for proposals. Computational modules may retrieve individual ratings of users from the database and computing group ratings. Further, the modules may compute estimates of bids at stages of a recursive auction. Mechanisms may exist to forward calls for proposals along the social network automatically based on computed trust levels, and those trust levels may be updated based on marketplace transactional ratings.

Figure 1:
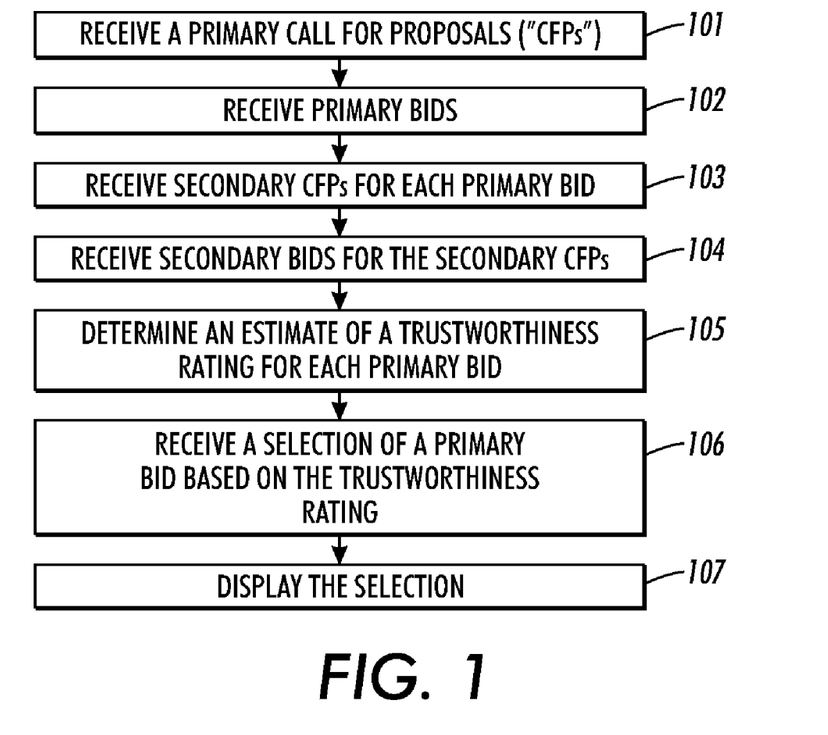
FIG. 1 depicts a flow diagram of an exemplary method of conducting a multi-level transaction according to embodiment.

FIG. 1 depicts a flow diagram of a first exemplary method of conducting a multi-level transaction according to an embodiment. As shown in FIG. 1, a primary call for proposals may be received 101 from a user. The user may post the call for proposals directly or may contact marketplace personnel via an electronic device or a telecommunication device to have the call for proposals posted. Additional and alternate ways of posting a call for proposals are included within the scope of this disclosure. The primary call for proposals may pertain to a request for a service or for one or more products and/or the like.

One or more primary bids with respect to the primary call for proposals may be received 102 by a computing system. The primary bids may be received 102 by a computing system from users who are providers and/or contractors. For each primary bid, one or more secondary calls for proposals may be received 103. The one or more secondary calls for proposals may be received 103 from users who are providers and/or contractors submitting primary bids. Additional and alternate users submitting primary bids are included in the scope of this disclosure. Each secondary call for proposals may include a job request associated with the primary bid.

One or more secondary bids with respect to the one or more secondary calls or proposals may be received 104 by a computing system. The secondary bids may be received 104 from users who are sub-providers and/or sub-contractors. Additional and alternate forms of users may also be applicable. In an embodiment, one or more child calls for proposals may be received for each secondary bid. Each child call for proposals may include a job requested associated with the secondary bid. One or more child bids with respect to the one or more child calls for proposals may be received by an computing system.

In an embodiment, receiving 104 one or more secondary bids may include receiving a probability of success rating. Additionally, a completeness level associated with the one or more secondary bids may be received.

Referring back to FIG. 1, an estimate of a trustworthiness rating for each primary bid may be automatically determined 105. The estimate of a trustworthiness rating may be based on a trustworthiness rating associated with the primary bid and one or more secondary bid trustworthiness ratings. In an embodiment, a secondary bid trustworthiness rating may be based on a trustworthiness rating associated with each secondary bid corresponding to a secondary call for proposals.

Figure 2:
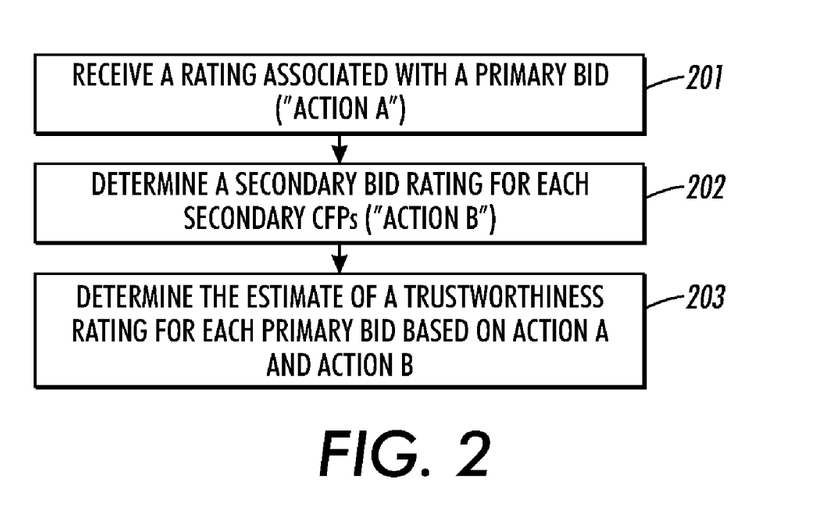
FIGS. 2-7 depict flow diagrams of embodiments of step 105 from FIG. 1 wherein an estimate of a trustworthiness rating for each primary bid may be automatically determined.

In an embodiment, determining 105 an estimate of the trustworthiness rating for each primary bid may include receiving 201 a rating associated with a primary bid. A secondary bid rating may be determined 202 for each secondary call for proposals by averaging a bid rating for each secondary bid associated with the secondary call for proposals. The estimate of the trustworthiness rating may be determined 203 based on the rating associated with the primary bid and the one or more secondary bid ratings.

Figure 3:
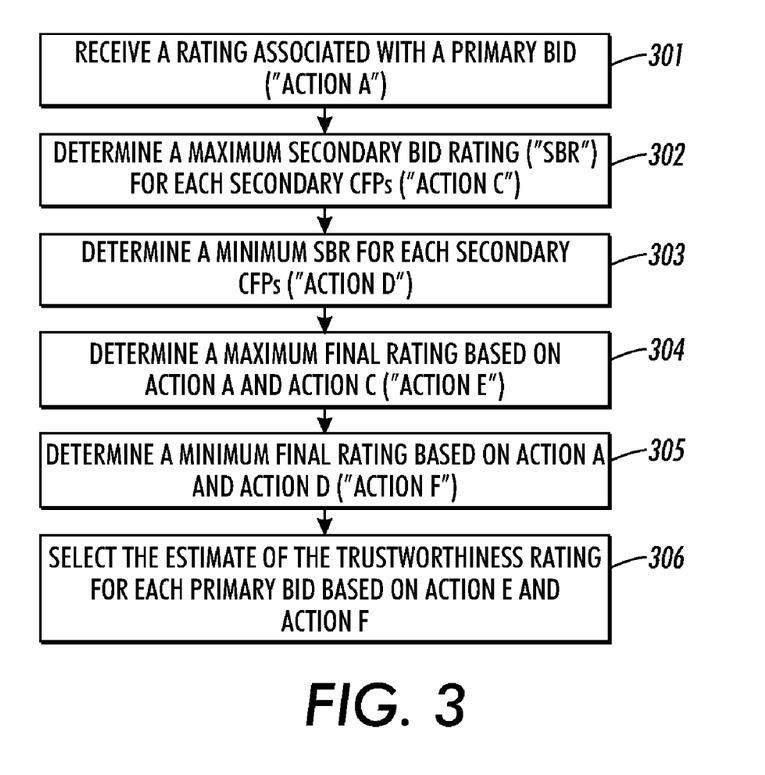

In an embodiment, determining 105 an estimate of the trustworthiness rating may include receiving 301 a rating associated with a primary bid. For each secondary call for proposals, maximum and minimum secondary bid ratings are determined 302/303. The maximum secondary bid rating is determined 302 by selecting a maximum bid rating from all secondary bids associated with the secondary call for proposals. The minimum secondary bid rating is determined 303 by selecting a minimum bid rating from all secondary bids associated with the secondary call for proposals. Maximum and minimum final ratings are determined 304/305 based on the rating associated with the primary bid and the one or more maximum or minimum secondary bid ratings respectively. The estimate of the trustworthiness rating based on the maximum final rating and the minimum final rating may be selected 306.

Figure 4:
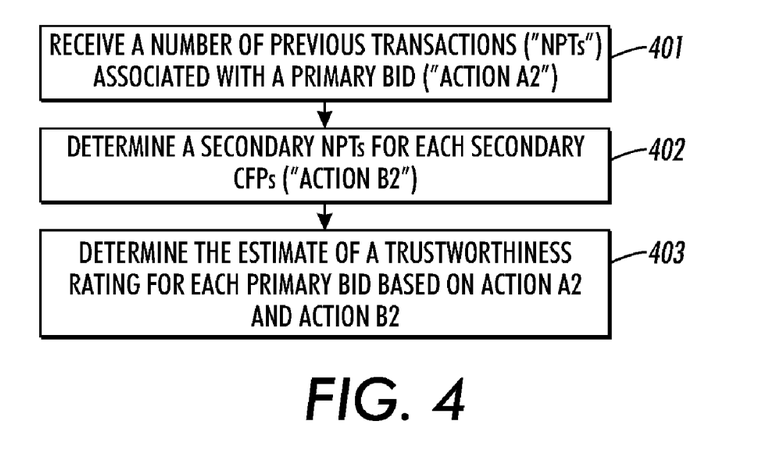

In an embodiment, determining 105 an estimate of the trustworthiness rating for each primary bid may include receiving 401 a number of previous transactions associated with a primary bid. In addition, secondary number of previous transactions is determined 402 for each secondary call for proposals by averaging a number of previous transactions for each secondary bid associated with the secondary call for proposals. The estimate of the trustworthiness rating is determined 403 based on the number of previous transactions associated with the primary bid and the one or more secondary numbers of previous transactions.

Figure 5:
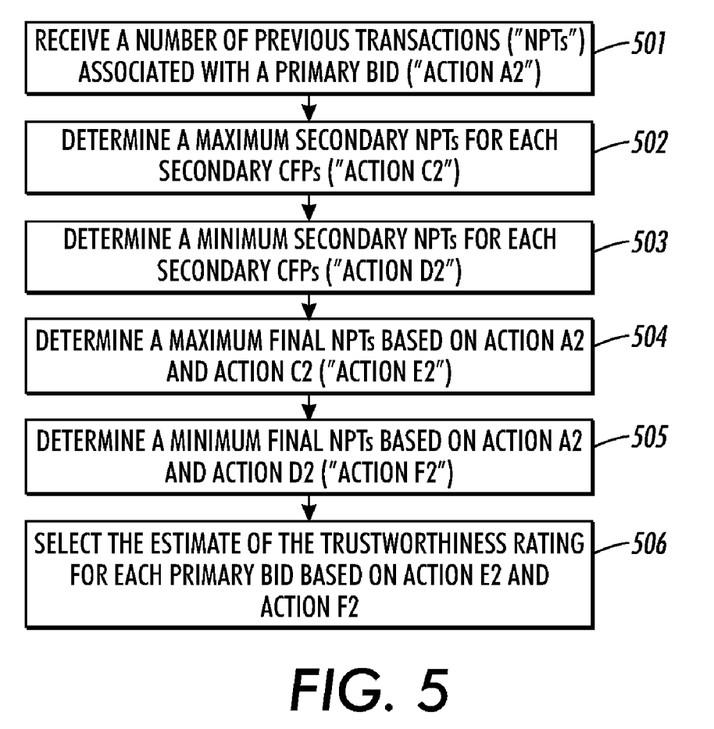

In an embodiment, determining 105 an estimate of the trustworthiness rating may include receiving 501 a number of previous transactions associated with a primary bid. For each secondary call for proposals, a maximum and a minimum secondary number of previous transactions may be determined 502/503. The maximum secondary number of previous transactions may be determined 502 by selecting a maximum number of previous transactions from all secondary bids associated with the secondary call for proposals. The minimum secondary number of previous transactions may be determined 503 by selecting a minimum number of previous transactions from all secondary bids associated with the secondary call for proposals. A maximum final number of previous transactions based on the number of previous transactions associated with the primary bid and the one or more maximum secondary numbers of previous transactions may be determined 504. A minimum final number of previous transactions based on the number of previous transactions associated with the primary bid and the one or more minimum secondary numbers of previous transactions may be determined 505. The estimate of the trustworthiness rating based on the maximum final number of previous transactions and the minimum final number of previous transactions may be selected 506.

Figure 6:
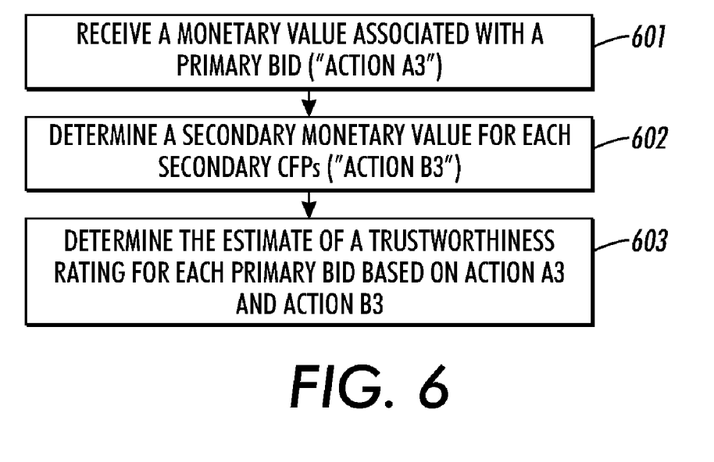

In an embodiment, determining 105 an estimate of the trustworthiness rating may include receiving 601 a monetary value associated with a primary bid. A secondary monetary value may be determined 602 for each secondary call for proposals by averaging a monetary value for each secondary bid associated with the secondary call for proposals. The estimate of the trustworthiness rating based on the monetary value associated with the primary bid and the one or more secondary monetary values may be determined 603.

Figure 7:
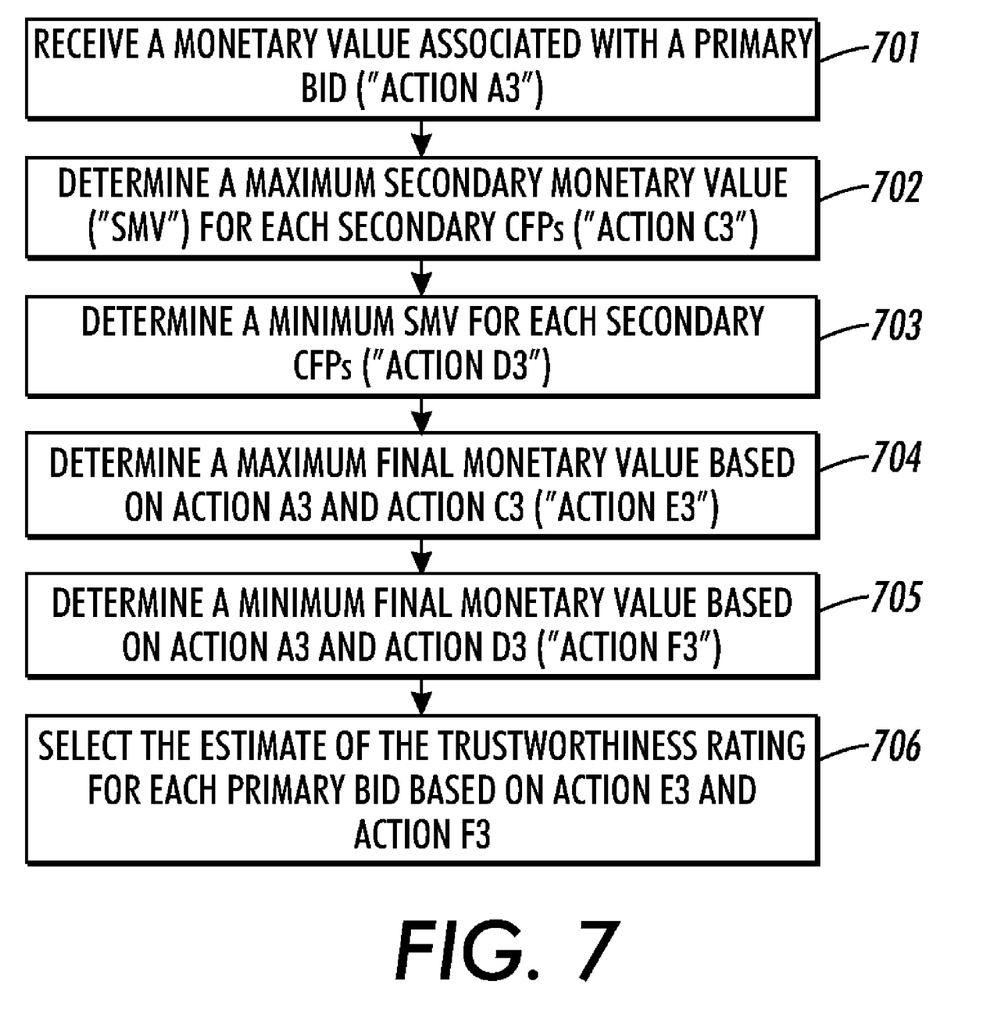

In an embodiment, determining 105 an estimate of the trustworthiness rating may include receiving 701 a monetary value associated with a primary bid. A maximum and a minimum secondary monetary value may be determined 702/703 for each secondary call for proposals. A maximum secondary monetary value may be determined 702 by selecting a maximum monetary value from all secondary bids associated with the secondary call for proposals. A minimum secondary monetary value may be determined 703 by selecting a minimum monetary value from all secondary bids associated with the secondary call for proposals. A maximum final monetary value based on the monetary value associated with the primary bid and the one or more maximum monetary values may be determined 704. A minimum final monetary value based on the monetary value associated with the primary bid and the one or more minimum monetary values may be determined 705. The estimate of the trustworthiness rating based on the maximum final monetary value and the minimum final monetary value may be selected 706.

In an embodiment, determining 105 an estimate of the trustworthiness rating may include receiving a rating of a team. The team may include one or more individual bidders associated through previous transactions. The one or more individual bidders may currently be in non-competing positions. A weight of a rating associated with one or more previous related transactions may be received. The estimate of the trustworthiness rating may be based on at least the weight and the rating.

Referring back to FIG. 1, a primary bid may be selected 106 based on the estimates of the trustworthiness rating. The selected primary bid 106 may be displayed 107. Additionally, one or more transactions based on the selection may be performed.

In an embodiment, a closing rating associated with the completion of each transaction is received. A final rating based on the closing rating for each transaction is computed. The one or more estimates of a trustworthiness rating for each transaction are updated based on the final rating.

In an embodiment, computing a final rating may include retaining a value rating based on a weight of one or more closing ratings.

In an embodiment, computing one or more final ratings may include averaging one or more closing ratings. Alternatively, computing one or more final ratings may include receiving a closing rating and multiplying the closing rating with a value associated with each transaction to determine a point valuation. The point valuation may be added to a cumulative rating to create a total cumulative rating. The total cumulative rating may be divided by a historical total of a nominal value of one or more past transactions to determine a value-weighted rating.

Although the embodiment disclosed above with respect to FIG. 1 includes two or three levels, any plurality of levels may be included within the scope of this disclosure.

Figure 8:
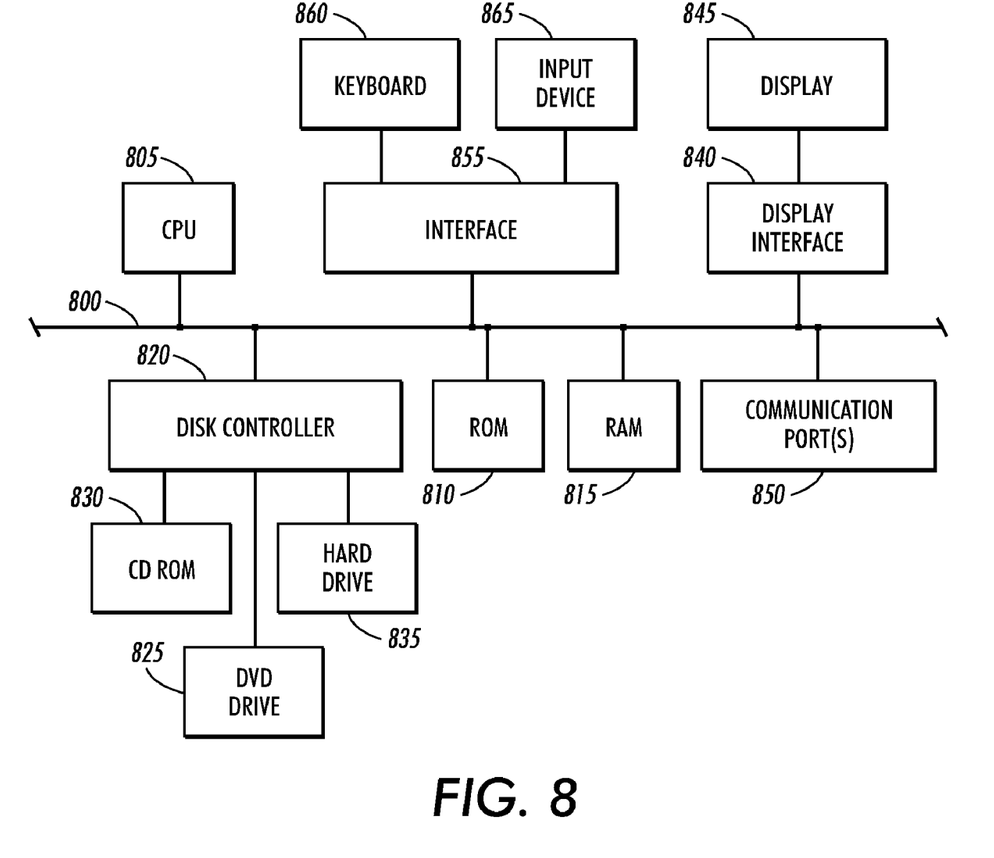
FIG. 8 is a block diagram of exemplary internal hardware that may be used to contain or implement program instructions according to an embodiment.

FIG. 8 depicts a block diagram of exemplary internal hardware that may be used to contain or implement program instructions according to an embodiment. A bus 800 serves as the main inform highway interconnecting the other illustrated components of the hardware. CPU 805 is the central processing unit of the system, performing calculations and logic operations required to execute a program. Read only memory (ROM) 810 and random access memory (RAM) 815 constitute exemplary memory devices or storage media.

An output device may communicate with the processor. Further, a computer-readable storage medium including one or more programming instructions may communicate with the processor. A disk controller 820 interfaces with one or more optional disk drives to the system bus 800. These disk drives may include, for example, external or internal DVD drives 825 CD ROM drives 830 or hard drives 835. As indicated previously, these various disk drives and disk controllers are optional devices.

Programming instructions may be stored in the ROM 810 and/or the RAM 815. Optionally, program instructions may be stored on any other tangible computer-readable storage medium, such as a hard drive, a compact disk, a digital disk, a memory or any other tangible storage medium.

An optional display interface 840 may permit information from the bus 800 to be displayed on a display 845 in audio, graphic or alphanumeric format. Communication with external devices may occur using various communication ports 850. Information detailing the one or more environmental footprint outputs may be displayed on an output device. In an embodiment displaying such information may include causing the information to be displayed on printing devices, display devices and/or the like. Additional and/or alternate output devices may be utilized within the scope of this disclosure.

In addition to the standard computer-type components, the hardware may also include an interface 855 which allows for receipt of data from input devices such as a keyboard 860 or other input device 265 such as a mouse, remote control, pointer and/or joystick.

An embedded system may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method of conducting a multi-level transaction, comprising:
   receiving a primary call for proposals;
   receiving, by a computing system, one or more primary bids with respect to the primary call for proposals;
   for each primary bid, receiving one or more secondary calls for proposals, wherein each secondary call for proposals includes a job request associated with the primary bid;
   receiving, by a computing system, one or more secondary bids with respect to the one or more secondary calls for proposals;
   for each primary bid, automatically determining an estimate of a trustworthiness rating, wherein the estimate of the trustworthiness rating is based on a trustworthiness rating associated with the primary bid and one or more secondary bid trustworthiness ratings, wherein determining the estimate of the trustworthiness rating comprises:
      receiving a number of previous transactions associated with a primary bid,
      for each secondary call for proposals:
         determining a maximum secondary number of previous transactions by selecting a maximum number of previous transactions from all secondary bids associated with the secondary call for proposals, and
         determining a minimum secondary number of previous transactions by selecting a minimum number of previous transactions from all secondary bids associated with the secondary call for proposals,
      determining a maximum final number of previous transactions based on the number of previous transactions associated with the primary bid and the one or more maximum secondary numbers of previous transactions,
      determining a minimum final number of previous transactions based on the number of previous transactions associated with the primary bid and the one or more minimum secondary numbers of previous transactions, and selecting the estimate of the trustworthiness rating based on the maximum final number of previous transactions and the minimum final number of previous transactions;

receiving the selection of a primary bid based on the estimates of the trustworthiness rating; and displaying the selection of the primary bid.

2. The method of claim 1, wherein a secondary bid trustworthiness rating is based on a trustworthiness rating associated with each secondary bid corresponding to a secondary call for proposals.

3. The method of claim 1, wherein receiving one or more secondary bids comprises:

receiving a probability of success rating; and receiving a completeness level associated with the one or more secondary bids.

4. The method of claim 1, further comprising:

receiving a closing rating associated with the completion of each transaction;

computing a final rating based on the closing rating for each transaction; and updating the one or more estimates of a trustworthiness rating for each transaction based on the final rating.

5. The method of claim 4, wherein computing a final rating comprises:

retaining a value rating based on a weight of one or more closing ratings.

6. The method of claim 4, wherein computing a final rating comprises:

averaging one or more closing ratings.

7. The method of claim 4, wherein computing one or more final ratings comprises:

receiving a rating;

multiplying the rating with a value associated with each transaction to determine a point valuation;

adding the point valuation to a cumulative rating to create a total cumulative rating; and dividing the total cumulative rating by a historical total of a nominal value of one or more past transactions to determine a value-weighted rating.

8. A system for conducting a multi-level transaction, comprising:

a processor in communication with an output device; and a non-transitory computer-readable storage medium in communication with the processor, wherein the computer-readable storage medium includes one or more programming instructions that, when executed, cause the processor to:

receive a primary call for proposals, receive one or more primary bids with respect to the primary call for proposals, receive one or more secondary calls for proposals for each primary bid, wherein each secondary call for proposals includes a job request associated with the primary bid, receive one or more secondary bids with respect to the one or more secondary calls for proposals, determine an estimate of a trustworthiness rating for each primary bid, wherein the estimate of the trustworthiness rating is based on a trustworthiness rating associated with the primary bid and one or more secondary bid trustworthiness ratings, wherein determining the estimate of the trustworthiness rating comprises:

receiving a number of previous transactions associated with a primary bid, for each secondary call for proposals:

determining a maximum secondary number of previous transactions by selecting a maximum number of previous transactions from all secondary bids associated with the secondary call for proposals, and determining a minimum secondary number of previous transactions by selecting a minimum number of previous transactions from all secondary bids associated with the secondary call for proposals, determining a maximum final number of previous transactions based on the number of previous transactions associated with the primary bid and the one or more maximum secondary numbers of previous transactions, determining a minimum final number of previous transactions based on the number of previous transactions associated with the primary bid and the one or more minimum secondary numbers of previous transactions, and selecting the estimate of the trustworthiness rating based on the maximum final number of previous transactions and the minimum final number of previous transactions, and cause the selection of one of the one or more primary bids based on the estimates of the trustworthiness rating.

9. The system of claim 8, wherein a secondary bid trustworthiness rating is based on a trustworthiness rating associated with each secondary bid corresponding to a secondary call for proposals.

10. The system of claim 8, wherein the one or more instructions that, when executed, cause the processor to receive one or more secondary bids comprise one or more instructions that, when executed, cause the processor to:

receive a probability of success rating; and receive a completeness level associated with the one or more secondary bids.

11. The system of claim 8, further comprising one or more instructions that, when executed, cause the processor to:

receive a closing rating associated with the completion of each transaction;

compute a final rating based on the closing rating for each transaction; and update the one or more estimates of a trustworthiness rating for each transaction based on the final rating.

12. The system of claim 11, wherein the one or more instructions that, when executed, cause the processor to compute a final rating comprise one or more instructions that, when executed, cause the processor to:

retain a value rating based on a weight of one or more closing ratings.

13. The system of claim 11, wherein the one or more instructions that, when executed, cause the processor to compute a final rating comprise one or more instructions that, when executed, cause the processor to:

average one or more closing ratings.

14. The system of claim 11, wherein the one or more instructions that, when executed, cause the processor to compute a final rating comprise one or more instructions that, when executed, cause the processor to:

receive a rating;

multiply the rating with a value associated with each transaction to determine a point valuation;

add the point valuation to a cumulative rating to create a total cumulative rating; and divide the total cumulative rating by a historical total of a nominal value of one or more past transactions to determine a value-weighted rating.

15. A method of conducting a multi-level transaction, comprising:
receiving a primary call for proposals;
receiving, by a computing system, one or more primary bids with respect to the primary call for proposals;
for each primary bid, receiving one or more secondary calls for proposals, wherein each secondary call for proposals includes a job request associated with the primary bid;
receiving, by a computing system, one or more secondary bids with respect to the one or more secondary calls for proposals;
for each primary bid, automatically determining an estimate of a trustworthiness rating, wherein the estimate of the trustworthiness rating is based on a trustworthiness rating associated with the primary bid and one or more secondary bid trustworthiness ratings, wherein determining an estimate of the trustworthiness rating for each primary bid comprises:
receiving a number of previous transactions associated with a primary bid,
for each secondary call for proposals, determining a secondary number of previous transactions by averaging a number of previous transactions for each secondary bid associated with the secondary call for proposals, and
determining the estimate of the trustworthiness rating based on the number of previous transactions associated with the primary bid and the one or more secondary numbers of previous transactions;
receiving the selection of a primary bid based on the estimates of the trustworthiness rating; and
displaying the selection of the primary bid.

16. The method of claim 15, wherein a secondary bid trustworthiness rating is based on a trustworthiness rating associated with each secondary bid corresponding to a secondary call for proposals.

17. The method of claim 15, wherein receiving one or more secondary bids comprises:
receiving a probability of success rating; and
receiving a completeness level associated with the one or more secondary bids.

18. The method of claim 15, further comprising:
receiving a closing rating associated with the completion of each transaction;
computing a final rating based on the closing rating for each transaction; and
updating the one or more estimates of a trustworthiness rating for each transaction based on the final rating.

19. The method of claim 18, wherein computing a final rating comprises:
retaining a value rating based on a weight of one or more closing ratings.

20. The method of claim 18, wherein computing a final rating comprises:
averaging one or more closing ratings.

21. The method of claim 18, wherein computing one or more final ratings comprises:
receiving a rating;
multiplying the rating with a value associated with each transaction to determine a point valuation;
adding the point valuation to a cumulative rating to create a total cumulative rating; and
dividing the total cumulative rating by a historical total of a nominal value of one or more past transactions to determine a value-weighted rating.

22. A system for conducting a multi-level transaction, comprising:
a processor in communication with an output device; and
a non-transitory computer-readable storage medium in communication with the processor, wherein the computer-readable storage medium includes one or more programming instructions that, when executed, cause the processor to:
receive a primary call for proposals,
receive one or more primary bids with respect to the primary call for proposals,
receive one or more secondary calls for proposals for each primary bid, wherein each secondary call for proposals includes a job request associated with the primary bid,
receive one or more secondary bids with respect to the one or more secondary calls for proposals,
determine an estimate of a trustworthiness rating for each primary bid, wherein the estimate of the trustworthiness rating is based on a trustworthiness rating associated with the primary bid and one or more secondary bid trustworthiness ratings, wherein determining the estimate of the trustworthiness rating comprises:
receiving a number of previous transactions associated with a primary bid,
for each secondary call for proposals, determining a secondary number of previous transactions by averaging a number of previous transactions for each secondary bid associated with the secondary call for proposals, and
determining the estimate of the trustworthiness rating based on the number of previous transactions associated with the primary bid and the one or more secondary numbers of previous transactions, and
cause the selection of one of the one or more primary bids based on the estimates of the trustworthiness rating.

23. The system of claim 22, wherein a secondary bid trustworthiness rating is based on a trustworthiness rating associated with each secondary bid corresponding to a secondary call for proposals.

24. The system of claim 22, wherein the one or more instructions that, when executed, cause the processor to receive one or more secondary bids comprise one or more instructions that, when executed, cause the processor to:
receive a probability of success rating; and
receive a completeness level associated with the one or more secondary bids.

25. The system of claim 22, further comprising one or more instructions that, when executed, cause the processor to:
receive a closing rating associated with the completion of each transaction;
compute a final rating based on the closing rating for each transaction; and
update the one or more estimates of a trustworthiness rating for each transaction based on the final rating.

26. The system of claim 25, wherein the one or more instructions that, when executed, cause the processor to compute a final rating comprise one or more instructions that, when executed, cause the processor to:
retain a value rating based on a weight of one or more closing ratings.

27. The system of claim 25, wherein the one or more instructions that, when executed, cause the processor to compute a final rating comprise one or more instructions that, when executed, cause the processor to:
  average one or more closing ratings.

28. The system of claim 25, wherein the one or more instructions that, when executed, cause the processor to compute a final rating comprise one or more instructions that, when executed, cause the processor to:
  receive a rating;
  multiply the rating with a value associated with each transaction to determine a point valuation;
  add the point valuation to a cumulative rating to create a total cumulative rating; and
  divide the total cumulative rating by a historical total of a nominal value of one or more past transactions to determine a value-weighted rating.

* * * * *